(12) United States Patent
Chan et al.

(10) Patent No.: US 9,298,491 B2
(45) Date of Patent: Mar. 29, 2016

(54) SYSTEM AND METHOD FOR LIVE CONVERSION AND MOVEMENT OF VIRTUAL MACHINE IMAGE AND STATE INFORMATION BETWEEN HYPERVISORS

(71) Applicant: vCumulus Limited, Hong Kong (HK)

(72) Inventors: Kwun Hok Chan, Hong Kong (HK); Hing Pong Leung, Hong Kong (HK)

(73) Assignee: VCUMULUS LIMITED, Hong Kong (HK)

( * ) Notice: Subject to any disclaimer, the term of this patent is extended or adjusted under 35 U.S.C. 154(b) by 317 days.

(21) Appl. No.: 13/925,879

(22) Filed: Jun. 25, 2013

(65) Prior Publication Data

US 2014/0380306 A1    Dec. 25, 2014

(51) Int. Cl.
*G06F 9/455*    (2006.01)

(52) U.S. Cl.
CPC .... *G06F 9/45558* (2013.01); *G06F 2009/4557* (2013.01)

(58) Field of Classification Search
None
See application file for complete search history.

(56) References Cited

U.S. PATENT DOCUMENTS

| 9,047,108 | B1 * | 6/2015 | Rajaa | G06F 9/4856 |
| 2009/0113109 | A1 * | 4/2009 | Nelson | G06F 11/203 711/6 |
| 2010/0094948 | A1 * | 4/2010 | Ganesh et al. | 709/212 |
| 2011/0145816 | A1 * | 6/2011 | Glikson et al. | 718/1 |

* cited by examiner

*Primary Examiner* — Adam Lee (57) ABSTRACT

A method for live conversion and movement of a virtual machine image and state information between hypervisors includes: freezing a current state of a source image; creating a proxy; redirecting any changes made to the source image to a journal of the proxy; reading from the source image; writing to the journal; converting the source image to a target image; and replaying the journal on the target image.

20 Claims, 6 Drawing Sheets

SYSTEM AND METHOD FOR LIVE CONVERSION AND MOVEMENT OF VIRTUAL MACHINE IMAGE AND STATE INFORMATION BETWEEN HYPERVISORS

FIELD OF THE PATENT APPLICATION

The present patent application generally relates to information technologies and more specifically to a system and a method for live conversion and movement of a virtual machine image and state information between hypervisors.

BACKGROUND

The current practice of virtual image conversion usually takes place using a vendor provided tool, which is proprietary in nature and only capable of converting other formats to the vendor's own specified format. It is a unidirectional conversion and the converted images are then configured to run on the vendor's virtualization platforms, but not vice versa. Such conversion is only sufficient in a private cloud environment as it is mainly a single vendor cloud virtual environment. However, with the emergence of the hybrid cloud infrastructure characterized by multi-vendors' heterogeneous platform, the above-mentioned private cloud infrastructure is no longer an attractive and effective option as compared to the hybrid infrastructure in terms of resources efficiency and disaster recovery considerations.

In an evolving hybrid cloud environment, image conversion across different hypervisors bi-directionally and movement of images between different cloud infrastructures are deemed necessary and important for performance optimization, operational management, and service availability considerations.

SUMMARY

The present patent application is directed to a system for live conversion and movement of a virtual machine image and state information between hypervisors. In one aspect, the system includes: means for freezing a current state of a source image; means for creating a proxy; means for redirecting any changes made to the source image to a journal of the proxy; means for reading from the source image; means for writing to the journal; means for converting the source image to a target image; means for reattaching the journal to the target image; and means for replaying the journal on the target image.

The system may further include means for creating a target container; means for synchronizing all data in the source image to the target container; and means for storing state information and process updates made to the source image in the proxy.

The proxy may include communication services configured to handle communication and data exchanges, a journal logger configured to keep track of the process state and activity information, a journal player configured to perform data synchronization, and a platform adapter configured to convert the format of the source image to the format of the target image.

The proxy may include a data storage repository that can be accessed directly by an operating system of the system. The source image may be in an online state or an offline state when being converted. The system may further include means for managing and monitoring related system job tasks. The system may further include means for storing and keeping track of process activities and state parameters. The system may further include means for interfacing with the proxy, performing necessary image conversion and synchronization to include any data change, and moving the target image to a target image repository through a storage adapter. The system may further include means for decommissioning the source image after the journal is replayed on the target image.

In another aspect, the present patent application provides a system for live conversion and movement of a virtual machine image and state information between hypervisors. The system includes a controller being configured for creating a proxy, freezing and intercepting a source image, redirecting the source image to a proxy container of the proxy, converting the source image to a target image, updating the target image by replaying any changes made to the source image recorded in the proxy on the target image, moving the updated target image to a target image repository, and destroying the source image. The proxy is configured to retrieve data from the source image upon a read request, and to record any changes made to the source image upon a write request.

The controller may be configured to create a target container, to synchronize all data in the source image to the target container, and to store state information and process updates made to the source image in the proxy. The proxy may include communication services configured to handle communication and data exchanges, a journal logger configured to keep track of the process state and activity information, a journal player configured to perform data synchronization, and a platform adapter configured to convert the format of the source image to the format of the target image.

The proxy container may be a data storage repository that can be accessed directly by an operating system of the system. The controller may include a job manager and a job scheduler, the job manger and the job scheduler being configured to work closely to manage and monitor related system job tasks. The controller may further include a job database, the job database being configured to store and keep track of process activities and state parameters. The controller may further include a job worker, the job worker being configured to interface with the proxy, perform necessary image conversion and synchronization to include any data change, and move the updated target image to the target image repository through a storage adapter.

In yet another aspect, the present patent application provides a method for live conversion and movement of a virtual machine image and state information between hypervisors. The method includes: freezing a current state of a source image; creating a proxy; redirecting any changes made to the source image to a journal of the proxy; reading from the source image; writing to the journal; converting the source image to a target image; and replaying the journal on the target image.

The method may further include creating a target container; synchronizing all data in the source image to the target container; and storing state information and process updates made to the source image in the proxy.

The proxy may include communication services configured to handle communication and data exchanges, a journal logger configured to keep track of the process state and activity information, a journal player configured to perform data synchronization, and a platform adapter configured to convert the format of the source image to the format of the target image.

The method may further include managing and monitoring related system job tasks; storing and keeping track of process activities and state parameters; interfacing with the proxy; performing necessary image conversion and synchronization to include any data change; and moving the target image to a target image repository through a storage adapter.

DETAILED DESCRIPTION

Reference will now be made in detail to a preferred embodiment of the system and the method for live conversion and movement of a virtual machine image and state information between hypervisors disclosed in the present patent application, examples of which are also provided in the following description. Exemplary embodiments of the system and the method disclosed in the present patent application are described in detail, although it will be apparent to those skilled in the relevant art that some features that are not particularly important to an understanding of the system and the method may not be shown for the sake of clarity.

Furthermore, it should be understood that the system and the method for live conversion and movement of a virtual machine image and state information between hypervisors disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
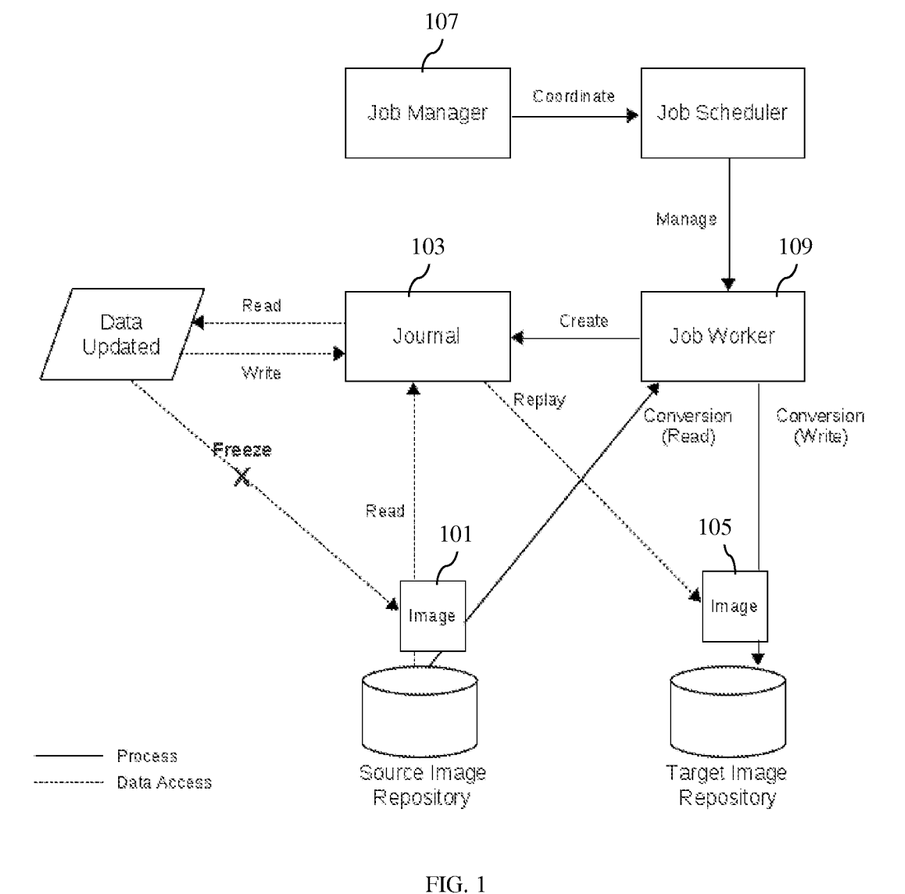
FIG. 1 is a block diagram of a system for live conversion and movement of a virtual machine image and state information between hypervisors according to an embodiment of the present patent application.

FIG. 1 is a block diagram of a system for live conversion and movement of a virtual machine image and state information between hypervisors according to an embodiment of the present patent application. Referring to FIG. 1, the system is configured to implement the following process: freezing a current state of a source image 101; creating a proxy and redirecting data (any changes made to the source image 101) to a journal 103 of the proxy; reading from the source image 101 and writing to the journal 103; converting the source image 101 to a target image 105; reattaching the journal 103 to the target image 105; replaying the journal 103 on the target image 105. Alternatively, after the proxy is created, when there is a read request, the read request will first be tried at the journal, and if the data is not inside the journal, the read request will then be passed to the source image. It is understood that the source image and the target image may be in any different formats.

Referring to FIG. 1, the system includes a system controller (also referred to as the controller hereafter) with a job manager 107 being built to control and manage the image conversion and migration activities. The image conversion process is handled through a job worker 109. The proxy implemented is used to maintain the state information of the source image 101 while it is being converted. Related activities are integrated and automated within the cloud platform through a storage adapter for interfacing, converting and moving the image. Image synchronization with the new data and related activities captured in a journal logger of the journal 103 is done through attaching and replaying activities. As a result, through the system provided by the embodiment, various process activities are better coordinated, and the workload within the hybrid cloud environment can be managed more effectively and efficiency to achieve higher system availability and better system performance.

Figure 2:
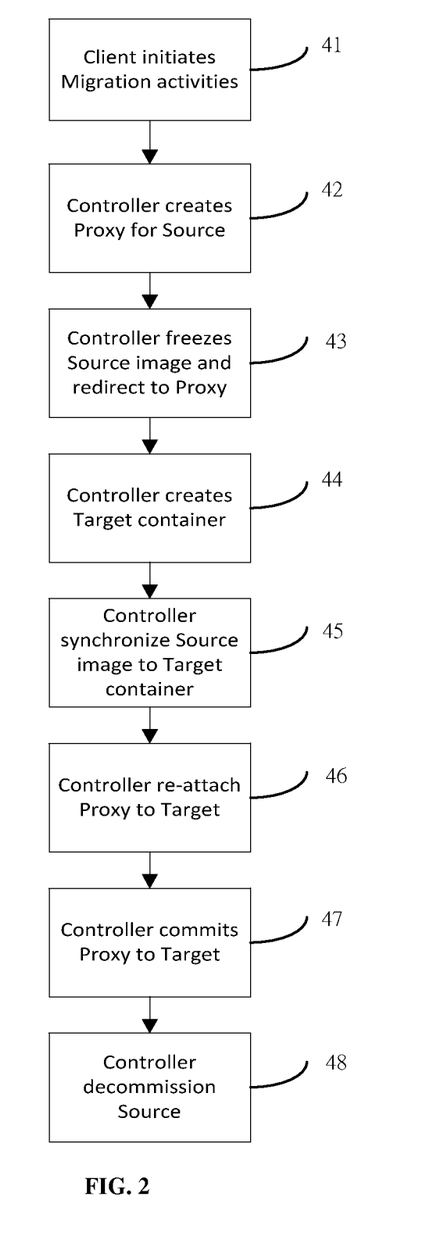
FIG. 2 is a flow chart illustrating a method for live conversion and movement of a virtual machine image and state information between hypervisors according to another embodiment of the present patent application.

FIG. 2 is a flow chart illustrating a method for live conversion and movement of a virtual machine image and state information between hypervisors according to another embodiment of the present patent application. Referring to FIG. 2, the process is initiated by the client, which can be a manually initiated activity or a system initiated activity (step 41). A system controller will create a proxy for a source image before the image conversion and movement begins (step 42). The source image is frozen and then controller redirects all data traffic to the proxy (step 43). The system controller creates a target container for the purpose of image processing and movement (step 44). All data in the source image is synchronized to the target container by the system controller, thereby creating a target image, while state information together with other process updates made to the source image during the conversion process are stored in the proxy (step 45). The system controller then re-attaches the proxy to the target image (step 46) and all changes stored in the proxy during the conversion process are committed to the target image (i.e. replaying the journal on the target image) (step 47). Finally the system controller decommissions the source image (step 48).

Figure 3:
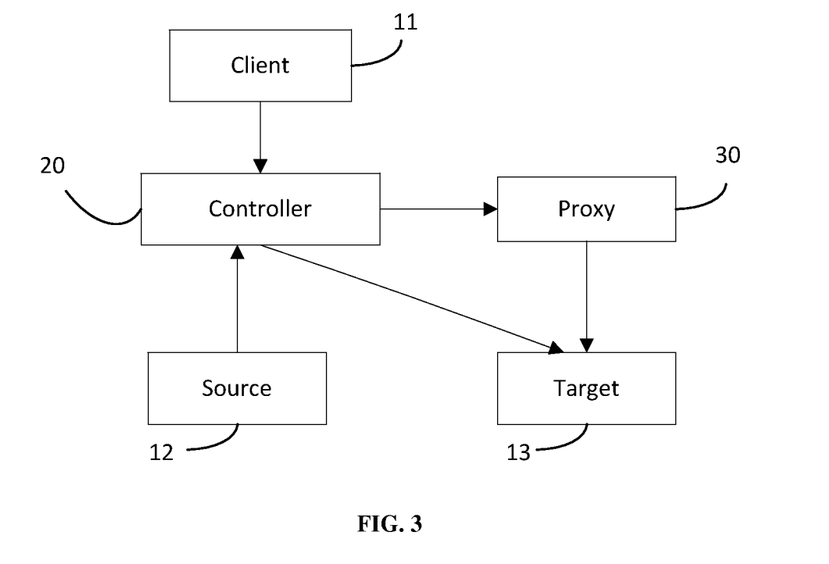
FIG. 3 is a block diagram of a system for live conversion and movement of a virtual machine image and state information between hypervisors according to another embodiment of the present patent application.

FIG. 3 is a block diagram of a system for live conversion and movement of a virtual machine image and state information between hypervisors according to another embodiment of the present patent application. Referring to FIG. 3, controlled by a client 11, a controller 20 initiates the process by reading an image (i.e. source image) from a source image repository 12 and finally writing the image to a target image repository 13 (i.e. creating a target image). Any update during the process of image conversion or workload movement is temporary stored in a proxy 30 and synchronized to the target image in the target image repository 13 afterwards to reflect any changes made to the source image and to resume the image back to its previous state and maintain data integrity. It is understood that the controller 20 in this embodiment supports more than one type of source and target systems, the source and target systems can be the same or different, and the source system (or the source image) can be in an online (powered on) state or an offline (powered off) state when the source image is being converted.

Figure 4:
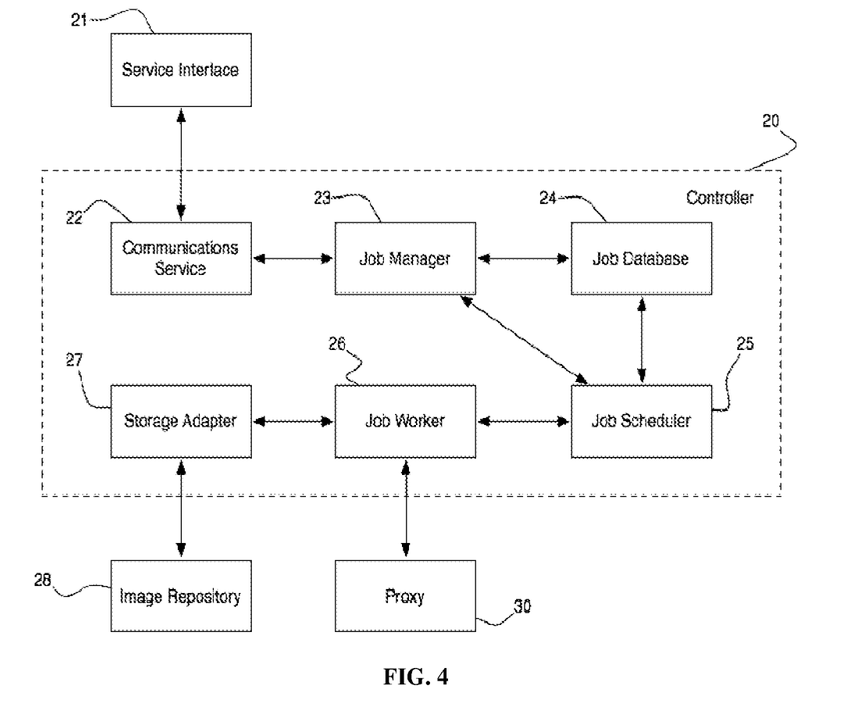
FIG. 4 shows a block diagram of a controller of the system depicted in FIG. 3.

FIG. 4 shows a block diagram of a controller of the system depicted in FIG. 3. Referring to FIG. 4, the controller 20, through its communication service 22, communicates with the services interface 21 of a hypervisor platform or API for image conversion and movement in live mode to exchange any data and process parameters during the conversion cycle.

In addition to the communication service 22, the controller 20 further includes a job manager 23, a job database 24, a job scheduler 25, a job worker 26, and a storage adapter 27. The job manager 23 works closely with the job scheduler 25 to manage and monitor related system job tasks while the job database 24 stores and keeps track of process activities and state parameters. The job worker 26, interfaces with the proxy 30, performs necessary image conversion and synchronization to include any data change during the conversion process to maintain data integrity, and finally moves the target image to the target machine (image repository) 28 through the storage adapter 27 after the process is completed.

Figure 5:
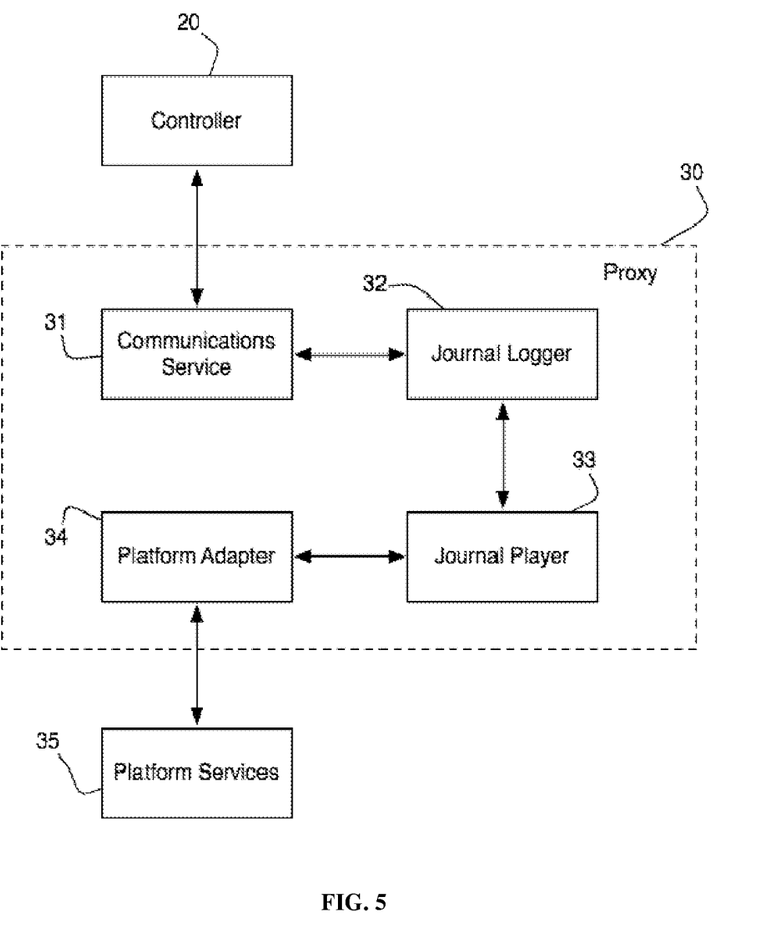
FIG. 5 shows a block diagram of a proxy of the system depicted in FIG. 3.

FIG. 5 shows a block diagram of a proxy of the system depicted in FIG. 3. Referring to FIG. 5, the proxy 30 includes four system components, namely communication services 31, a journal logger 32, a journal player 33, and a platform adapter 34. The communication services 31 are configured to handle communication and data exchanges with the controller 20. The journal logger 32 is configured to keep track of the process state and activity information. The journal player 33 is configured to perform data synchronization to ensure data integrity. The platform adapter 34 is configured to convert the format of the source image to the format of the target image so as to suit the target system by using services provided by the vendor's virtualization platform 35. It is noted the proxy 30 in this embodiment includes a data storage repository that can be accessed directly by an operating system of the system, and includes at least one of following storage mediums: solid magnetic disks, complex flash disks, locally connected hard disks, external hard disks, USB disks, floppy disks, remote magnetic disks and memory space, and etc.

Figure 6:
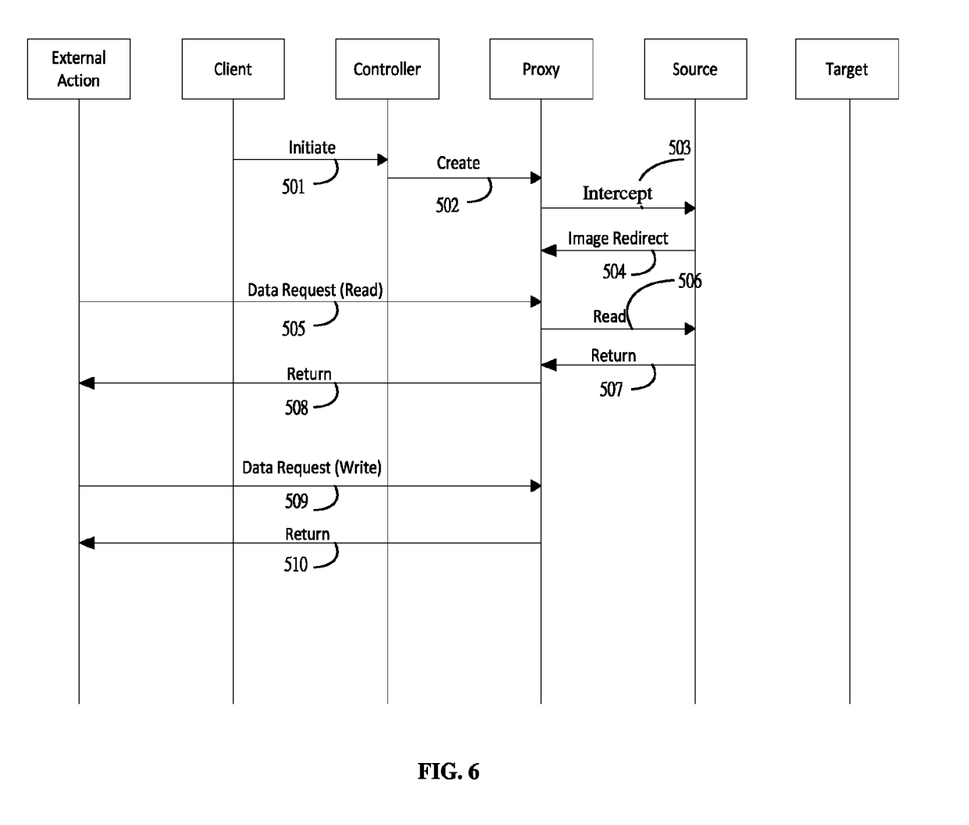
FIG. 6 is a diagram illustrating a data flow in the system depicted in FIG. 3.

FIG. 6 is a diagram illustrating a data flow in the system depicted in FIG. 3. Referring to FIG. 6, the data flow starts with a client initiated request to the controller, which is either a manual or system generated action (flow 501). The controller then creates a proxy (flow 502), freezes and intercepts the source image (flow 503), and redirects the source image to a proxy container of the proxy (flow 504) for image conversion. It is noted that the proxy container is a data storage repository that can be accessed directly by an operating system of the system.

Whenever a read request is made during the image conversion and migration process (flow 505), the proxy reads data from the source (i.e. the source image) (flow 506), retrieves the data from the source image (flow 507), and finally returns the data to an external agent (flow 508).

For a write request during the image conversion and migration process (flow 509), the proxy keeps track of the process activities and related data (i.e. records any changes made to the source image) and returns a success signal to the external agent for acknowledgment of process completion (flow 510).

Figure 7:
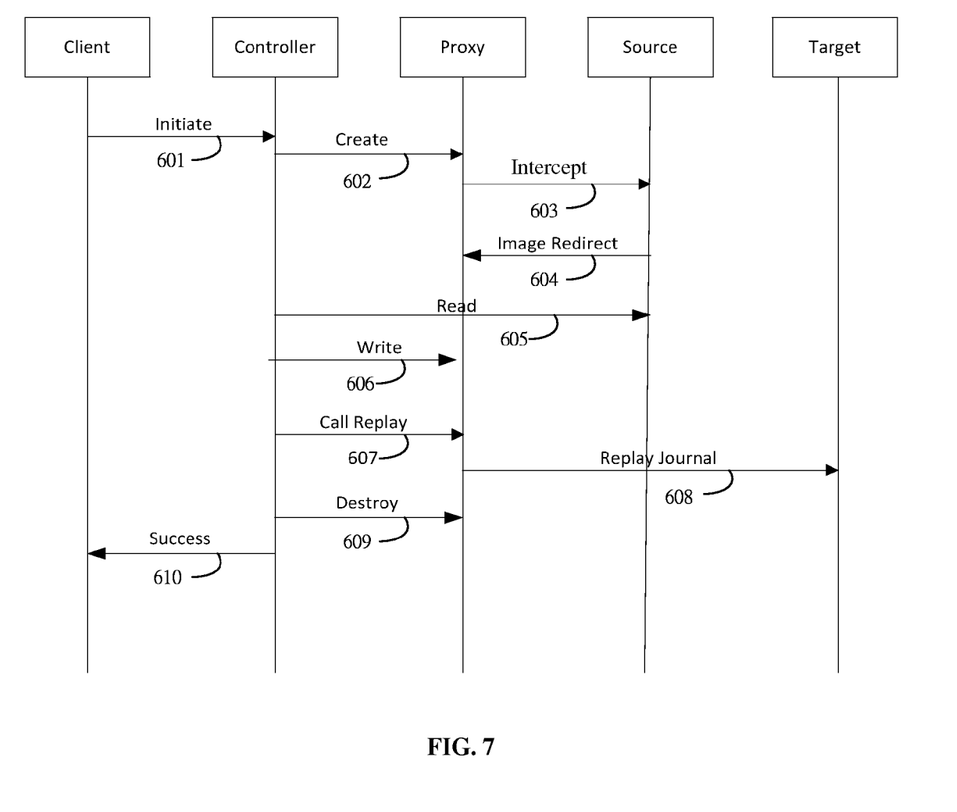
FIG. 7 is a diagram illustrating a process flow for an image conversion and migration process executed by the system depicted in FIG. 3.

FIG. 7 is a diagram illustrating a process flow for an image conversion and migration process executed by the system depicted in FIG. 3. Referring to FIG. 7, the process starts with a client initiated request, which is either a manual or system generated request, to the controller (flow 601). Upon receiving the request, the controller performs a sequence of activities, namely creating a proxy (flow 602), freezing and intercepting the source image (flow 603), and redirecting the source image to the proxy container (flow 604), to kick-start the image conversion and migration process.

For read operations, the controller reads data directly from the source (flow 605). For write operations, the controller writes data (flow 606) into the proxy, which will synchronize the data with the converted image.

After converting the source image to a target image, the controller initiates a call replay instruction (flow 607) (i.e. updating the target image by replaying any changes made to the source image recorded in the proxy on the target image), moves the updated target image to a target image repository (i.e. a target system) (flow 608), and destroys the source image in a source container after the movement (flow 609). Finally a success signal is issued (flow 610) to notify the client of the completion of the process.

According to another embodiment of the present patent application, a system for live conversion and movement of a virtual machine image and state information between hypervisors includes means for freezing a current state of a source image; means for creating a proxy; means for redirecting any changes made to the source image to a journal of the proxy; means for reading from the source image; means for writing to the journal; means for converting the source image to a target image; means for reattaching the journal to the target image; and means for replaying the journal on the target image.

According to yet another embodiment of the present patent application, a system for live conversion and movement of a virtual machine image and state information between hypervisors includes a controller being configured for creating a proxy, freezing and intercepting a source image, redirecting the source image to a proxy container of the proxy, converting the source image to a target image, updating the target image by replaying any changes made to the source image recorded in the proxy on the target image, moving the updated target image to a target image repository, and destroying the source image. The proxy is configured to retrieve data from the source image upon a read request, and to record any changes made to the source image upon a write request.

According to still another embodiment of the present patent application, a method for live conversion and movement of a virtual machine image and state information between hypervisors includes freezing a current state of a source image; creating a proxy; redirecting any changes made to the source image to a journal of the proxy; reading from the source image; writing to the journal; converting the source image to a target image; and replaying the journal on the target image.

The embodiments described above address the issue of online image conversion and workload movement in the hybrid cloud environment. The embodiments integrate the process activities, and streamline and automate the whole process through the storage adapter as a jointing point for process integration and automation. The systems provided by the embodiments allow live operations by managing activities and keeping track of the related activities and state information through the implementation of the job scheduler, the job database, and the job worker within the system controller. The systems perform image conversion with the implementation of the proxy and the journal to ensure data integrity and synchronization during the process. Through the methods provided by the embodiments, the related multi-stage activities are more seamlessly integrated together and automated into a simple and single process.

With the above-mentioned embodiments, images of different formats can be created across different hypervisors and moved from a source machine to a target machine effectively and efficiently without any system downtime or interruption in a hybrid cloud infrastructure, which cannot be achieved otherwise without additional hardware or software customizations. The embodiments provide a more integrated method to manage the two interrelated processes of image conversion and workload movement through a more coordinated and logical manner thus streamlining the operation management and achieving better availability and system performance.

The above-mentioned embodiments allow disaster recovery and workload migration to be performed in a more cohesive and efficient way by simplifying the operation management in a hybrid cloud infrastructure and allow a one-take action to address disaster recovery and performance optimization considerations, which are otherwise addressed through different stand-alone system modules and with different hardware and software components separately.

While the present patent application has been shown and described with particular references to a number of embodiments thereof, it should be noted that various other changes or modifications may be made without departing from the scope of the present invention.

What is claimed is:

1. A system for live conversion and movement of a virtual machine image and state information between hypervisors, the system comprising:
   means for freezing a current state of a source virtual machine image;
   means for creating a proxy;
   means for redirecting any changes directed to the source virtual machine image to a journal of the proxy;
   means for reading from the source virtual machine image;
   means for writing to the journal;
   means for converting the source virtual machine image to a target virtual machine image;
   means for attaching the journal to the target virtual machine image; and
   means for synchronizing data from the journal to the target virtual machine image.

2. The system of claim 1 further comprising means for creating a target container; means for synchronizing all data in the source virtual machine image to the target container; and means for storing state information and process updates made to the source virtual machine image in the proxy.

3. The system of claim 1, wherein the proxy comprises communication services configured to handle communication and data exchanges, a journal logger configured to keep track of a process state and activity information, a journal player configured to perform data synchronization, and a platform adapter configured to convert the format of the source virtual machine image to the format of the target virtual machine image.

4. The system of claim 1, wherein the proxy comprises a data storage repository that can be accessed directly by an operating system of the system.

5. The system of claim 1, wherein the source virtual machine image is in an online state or an offline state when being converted.

6. The system of claim 1 further comprising means for managing and monitoring related system job tasks.

7. The system of claim 6 further comprising means for storing and keeping track of process activities and state parameters.

8. The system of claim 7 further comprising means for interfacing with the proxy, performing necessary image conversion and synchronization to include any data change, and moving the target virtual machine image to a target virtual machine image repository through a storage adapter.

9. The system of claim 1 further comprising means for decommissioning the source virtual machine image after the data from the journal is synchronized on the target virtual machine image.

10. A system for live conversion and movement of a virtual machine image and state information between hypervisors, the system comprising:
    a controller comprising a processor and memory in a hybrid cloud infrastructure and being configured for creating a proxy, freezing and intercepting a source virtual machine image, redirecting any changes directed to the source virtual machine image to be recorded in a proxy container of the proxy, converting the source virtual machine image to a target virtual machine image, updating the target virtual machine image by synchronizing any changes redirected from the source virtual machine image and recorded in the proxy to the target virtual machine image, moving the updated target virtual machine image to a target virtual machine image repository, and destroying the source virtual machine image; wherein:
    the proxy is configured to retrieve data from the source virtual machine image upon a read request, and to record any changes made to the source virtual machine image upon a write request.

11. The system of claim 10, wherein the controller is configured to create a target container, to synchronize all data in the source virtual machine image to the target container, and to store state information and process updates made to the source virtual machine image in the proxy.

12. The system of claim 10, wherein the proxy comprises communication services configured to handle communication and data exchanges, a journal logger configured to keep track of the process state and activity information, a journal player configured to perform data synchronization, and a platform adapter configured to convert the format of the source virtual machine image to the format of the target virtual machine image.

13. The system of claim 10, wherein the proxy container is a data storage repository that can be accessed directly by an operating system of the system.

14. The system of claim 10, wherein the controller comprises a job manager and a job scheduler, the job manager and the job scheduler being configured to work together to manage and monitor related system job tasks.

15. The system of claim 14, wherein the controller further comprises a job database, the job database being configured to store and keep track of process activities and state parameters.

16. The system of claim 15, wherein the controller further comprises a job worker, the job worker being configured to interface with the proxy, perform necessary image conversion and synchronization to include any data change, and move the updated target virtual machine image to the target virtual machine image repository through a storage adapter.

17. A method for live conversion and movement of a virtual machine image and state information between hypervisors, the method comprising:
    freezing a current state of a source virtual machine image;
    creating a proxy;
    redirecting any changes directed to the source virtual machine image to a journal of the proxy;
    reading from the source virtual machine image;
    writing to the journal;
    converting the source virtual machine image to a target virtual machine image; and
    synchronizing data from the journal to the target virtual machine image.

18. The method of claim 17 further comprising creating a target container; synchronizing all data in the source virtual machine image to the target container; and storing state information and process updates made to the source virtual machine image in the proxy.

19. The method of claim 17, wherein the proxy comprises communication services configured to handle communication and data exchanges, a journal logger configured to keep track of the process state and activity information, a journal player configured to perform data synchronization, and a platform adapter configured to convert the format of the source virtual machine image to the format of the target virtual machine image.

20. The method of claim 17 further comprising managing and monitoring related system job tasks; storing and keeping track of process activities and state parameters; interfacing with the proxy; performing necessary image conversion and synchronization to include any data change; and moving the target virtual machine image to a target virtual machine image repository through a storage adapter.

\* \* \* \* \*